Sept. 2, 1969 C. W. ZEBE 3,465,104
STEP-BY-STEP TELEPHONE SYSTEM WITH RANGE EXTENSION
Filed Sept. 9, 1966 5 Sheets-Sheet 1

INVENTOR
C. W. ZEBE
BY [signature]
ATTORNEY

Sept. 2, 1969 C. W. ZEBE 3,465,104

STEP-BY-STEP TELEPHONE SYSTEM WITH RANGE EXTENSION

Filed Sept. 9, 1966 5 Sheets-Sheet 3

STEP-BY-STEP TELEPHONE SYSTEM WITH RANGE EXTENSION

Filed Sept. 9, 1966

STEP-BY-STEP TELEPHONE SYSTEM WITH RANGE EXTENSION

Filed Sept. 9, 1966

United States Patent Office 3,465,104
Patented Sept. 2, 1969

3,465,104

STEP-BY-STEP TELEPHONE SYSTEM WITH RANGE EXTENSION

Charles W. Zebe, New Shrewsbury, N.J., assignor to Bell Telephone Laboratories, Incorporated, Murray Hill and Berkeley Heights, N.J., a corporation of New York
Filed Sept. 9, 1966, Ser. No. 578,345
Int. Cl. H04m *3/42*
U.S. Cl. 179—16 8 Claims

ABSTRACT OF THE DISCLOSURE

I disclose a step-by-step telephone switching system adapted to provide range extension facilities for high impedance customer loops without the necessity for segregating such loops on particular connectors. Terminating line finders are provided between the high impedance loops and the conventional connectors which incorporate range extension facilities in the path between a connector and a called high impedance loop on terminating calls. For originatinng calls, high impedance loops are terminated on special line finders. These special line finders extend to trunks incorporating range extension facilities which couple the line finders and the conventional first selectors.

This invention relates to telephone switching systems of the step-by-step type and, more particularly, to range extension circuitry for such telephone systems.

In certain prior art telephone practice, it was customary to govern the design characteristics of telephone cables and wire line facilities in accordance with the distance between the substation and the telephone central office. Since the resistance of a telephone loop or wire pair between the substation and the office varies in accordance with the length of the loop, it is apparent that the resistance over the transmission path from the office to those substations at a relatively greater distance is higher than that of the corresponding transmission path of nearer substations. Moreover, as is well known, the distance range of supervisory equipment and dial pulse receiving equipment at the office is predicated on the resistance of the majority of line loops; critical conditions may arise with respect to those stations having loops exceeding a predetermined length or resistance.

The ameliorative efforts which have been employed in the past included the use of greater diameter wires which inherently have a reduced impedance per unit length. Also specially designed "long line circuits" have been used which are designed to respond to reduced intensity signals from substations on long line circuits.

The disadvantages of these measures detracted, in part, from the benefits occasioned by their use. They are, nevertheless, wholly operative and useful expedients.

Specifically, where higher diameter wire is used, the underground conduits or enclosures in which such cables are placed can contain only a correspondingly reduced number of wire pairs. In addition, it is apparent that very substantial savings in outside plant wire and cable expenditures may be effected if all wire pairs were of uniform gauge.

With respect to the installation of so-called long line circuits, the prior art has dictated, in part, the preparation of separate repeating circuits for each of the lines to be accorded the long line service.

An improved type of long line circuit for use in step-by-step telephone switching systems was described in an application of C. W. Zebe, filed Mar. 9, 1965, Ser. No. 438,318, now Patent 3,403,228, issued Sept. 24, 1968. This latter arrangement was predicate don the incorporation of shared long line circuits "outside" of the central office switching train.

It is therefore an object of this invention to provide long line circuits interposed within the step-by-step switching train.

One of the difficulties inherent in the inclusion of long line circuitry in step-by-step telephone switching systems relates to the well known interrelationship between a called directory number in a step-by-step office and the physical equipment termination or equipment number on a step-by-step connector circuit. Thus, if the final two digits of a called station directory number are 83, the physical termination of the line is, in fact, on the eighth level of the connector switch at the third row of contacts.

It is, of course, desirable to provide range extension facilities within the terminating switching train of a step-by-step system in a manner which permits the joint usage of the range extender by a plurality of called substations. However, if the range extender circuit is merely incorporated in the connector, it would be necessary, in view of the inflexible relationship between the called directory number and the physical equipment location, to assign long lines which require range extension to particular connector groups equipped with range extenders. In turn, as explained above, it would be necessary to restrict the directory number of such long line substations to those numbers served by long loop connectors having range extension facilities. Those conversant in the telephone art are aware of the handicap thus imposed and the attendant inconvenience to those customers who, although "long" line customers, nevertheless, require or prefer a directory number which is incompatible with those available to the special connectors equipped with range extension.

It is therefore an additional object of this invention to provide for the inclusion of range extension circuitry within a step-by-step switching train without requiring the segregation of long loop lines on particular connectors and to preclude the necessity for restricting directory number assignments to long loop customers.

These and other objects and features of the invention are realized in one specific illustrative embodiment in which range extender circuitry is included on originating connections by the use of a converter trunk which is also attached to provide TOUCH-TONE facilities in step-by-step systems and by utilizing the terminating line finder on terminating connections to long lines to interpose a range extender circuit between the conventional connector circuit and the called line.

Thus, on originating calls a modified line circuit, described herein as an originating and terminating line circuit, is energized to initiate the operation of a conventional "originating" line finder which hunts for and seizes the terminals of the calling line.

Since the calling line is assumed to be a long line it is terminated on a line finder which extends to a converter trunk (or a "loop-splitting" trunk) which couples the line finder and the conventional first selector. The converter trunk is utilized in the prior art to interpose TOUCH-TONE facilities within a step-by-step switching office as explained in detail in Patent 3,133,155 of F. C. Kuchas of May 12, 1964 and is utilized herein to additionally provide range extension facilities. As is well known, the segregation of long loop lines on particular conventional line finders, which extend to the above-referred-to converter trunks, represents no substantial operational impediment.

Moreover, the handicap which would normally attach to the forced segregation of called long lines on special connector circuits is obviated in the present arrangement by assigning long lines and non-long lines to connector circuits without restriction. However, the terminals of a long line on a connector circuit are further extended to the terminals of a terminating line finder which is equipped with range extension. In consequence, when a terminating connection is extended to the terminals of a long line on a conventional connector, a signal is delivered to the originating and terminating line circuit which initiates "hunting" by a terminating line finder for the terminals of the called line. When the terminating line finder seizes the called line terminals, a path is available from the incoming switch train, through the conventional connector circuit and the terminating line finder circuit which incorporates range extension facilities to the originating and terminating line circuit and finally to the called line. In this manner, the terminating line finder incorporates range extension on a terminating connection in contrast to conventional line finder operation which is effective on originating calls to extend the originating switching train in the manner described above.

These and other objects and features of the invention will be more readily comprehended from an examination of the following specification, appended claims and drawing, in which:

Figure 1:
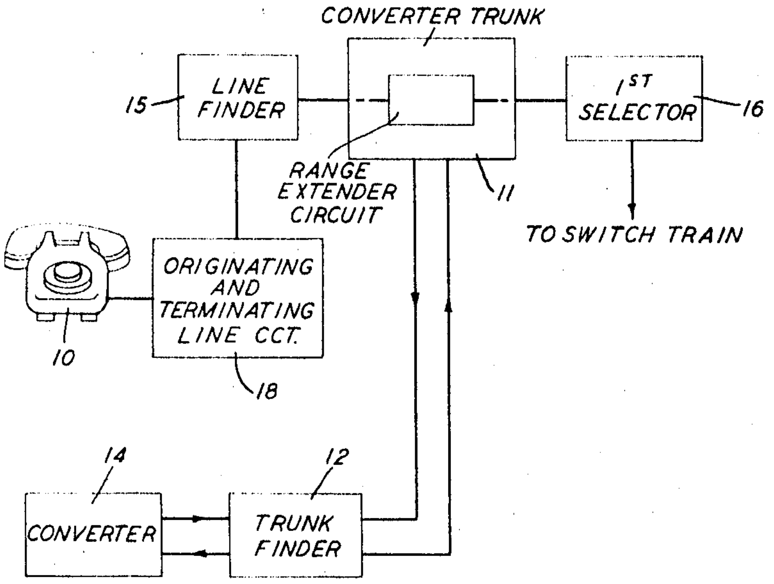
FIG. 1 shows one specific illustrative embodiment of the originating connection of a step-by-step switching train, in accordance with my invention in outline form.
Figure 2:
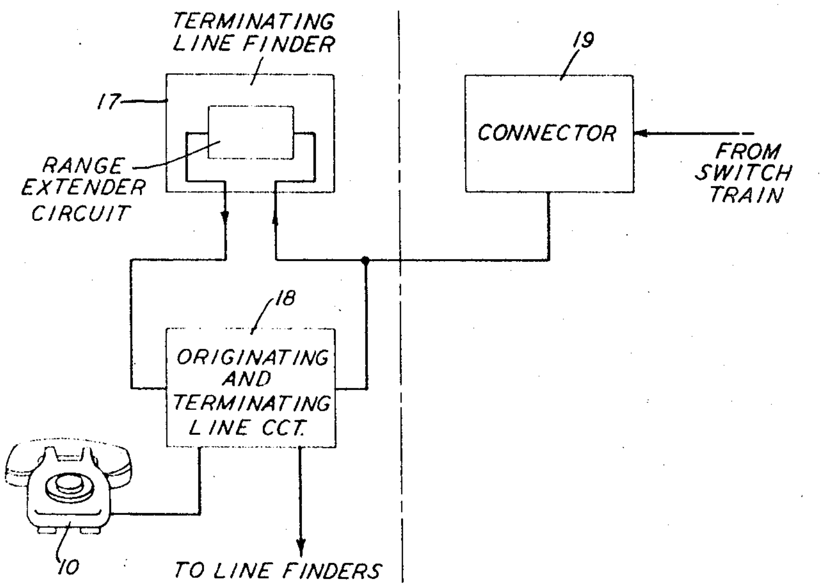
FIG. 2 shows one specific illustrative embodiment of the terminating operation of a step-by-step switching train in accordance with my invention.
Figure 3:
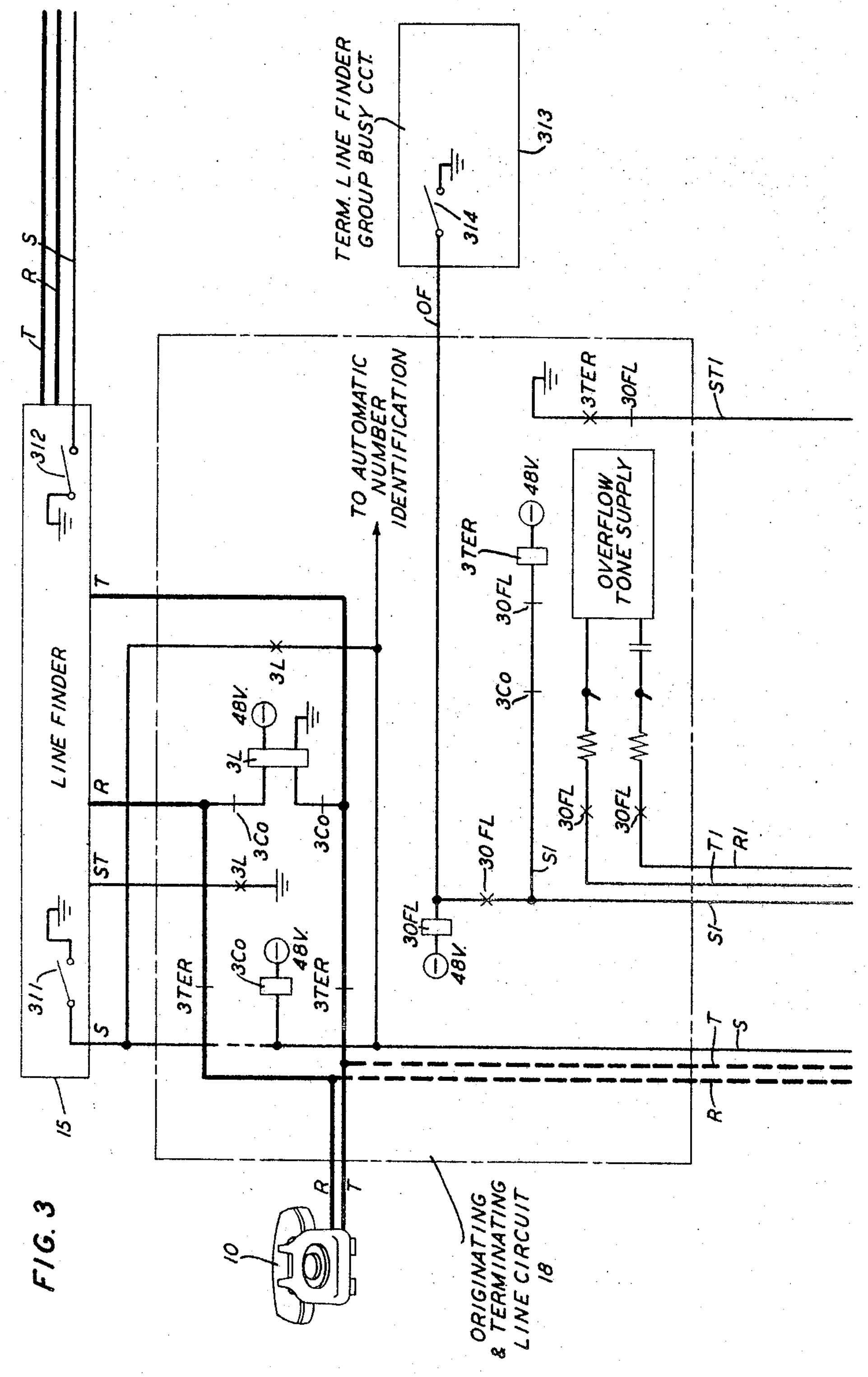
Figure 4:
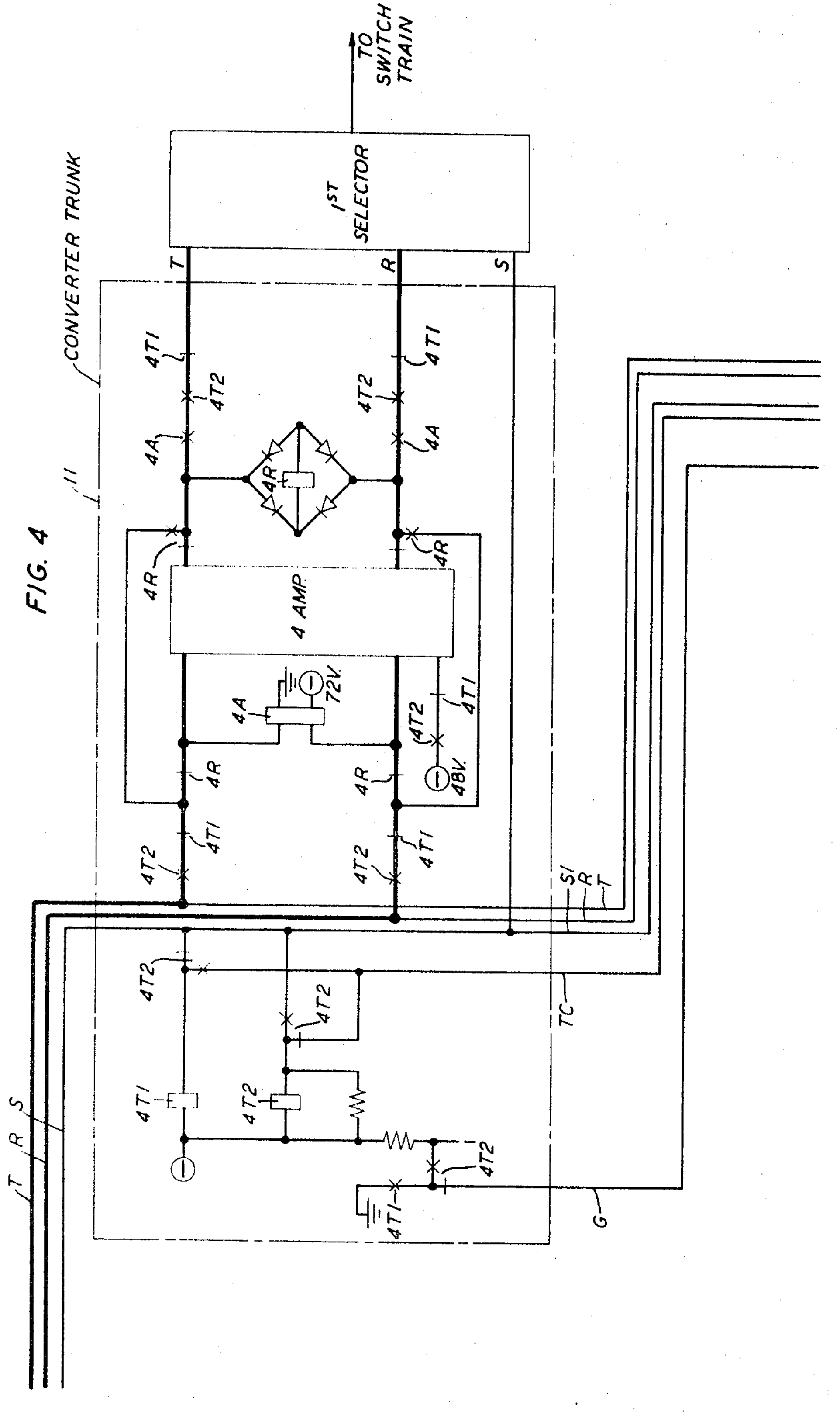
Figure 5:
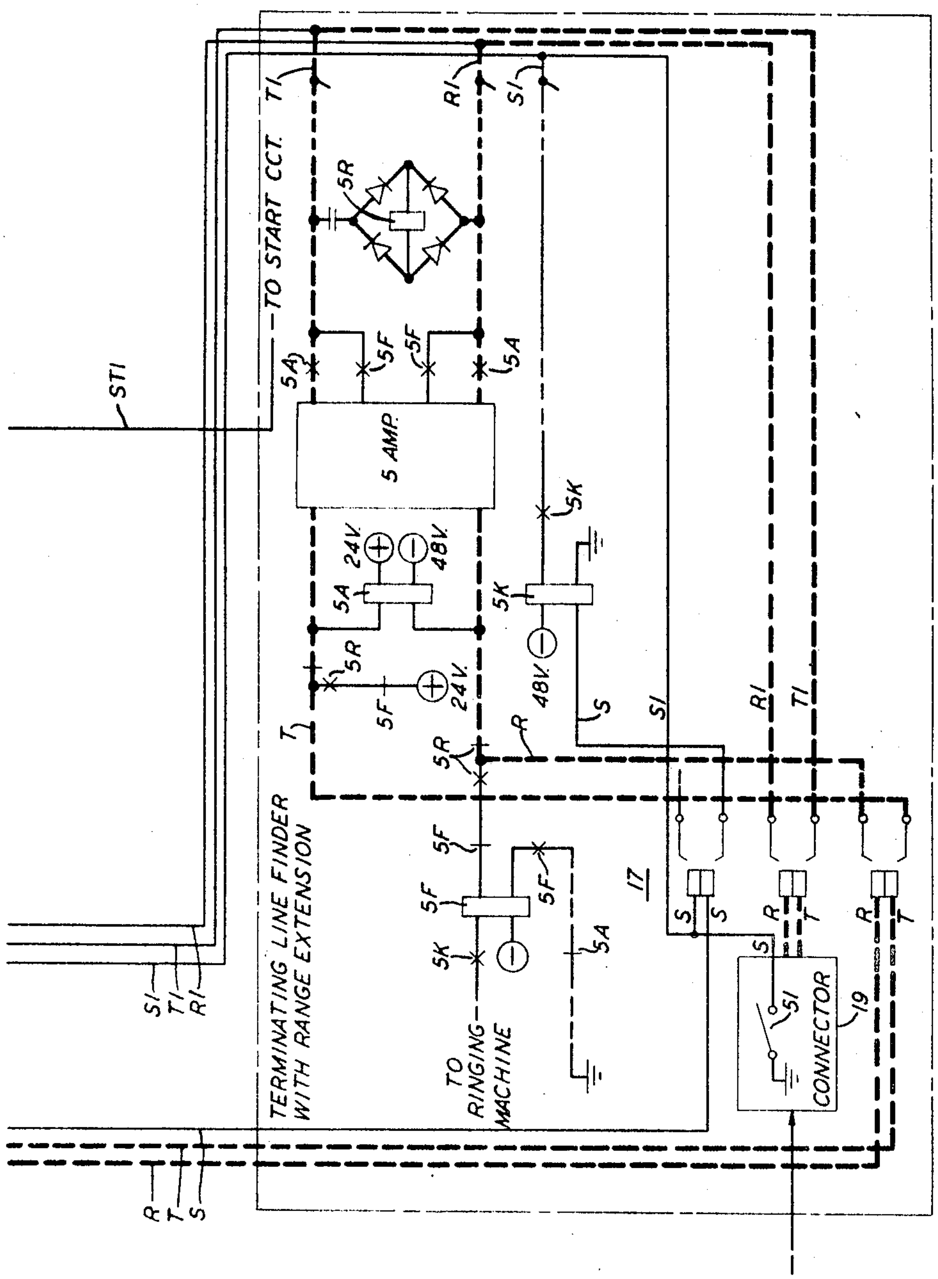
Figure 6:
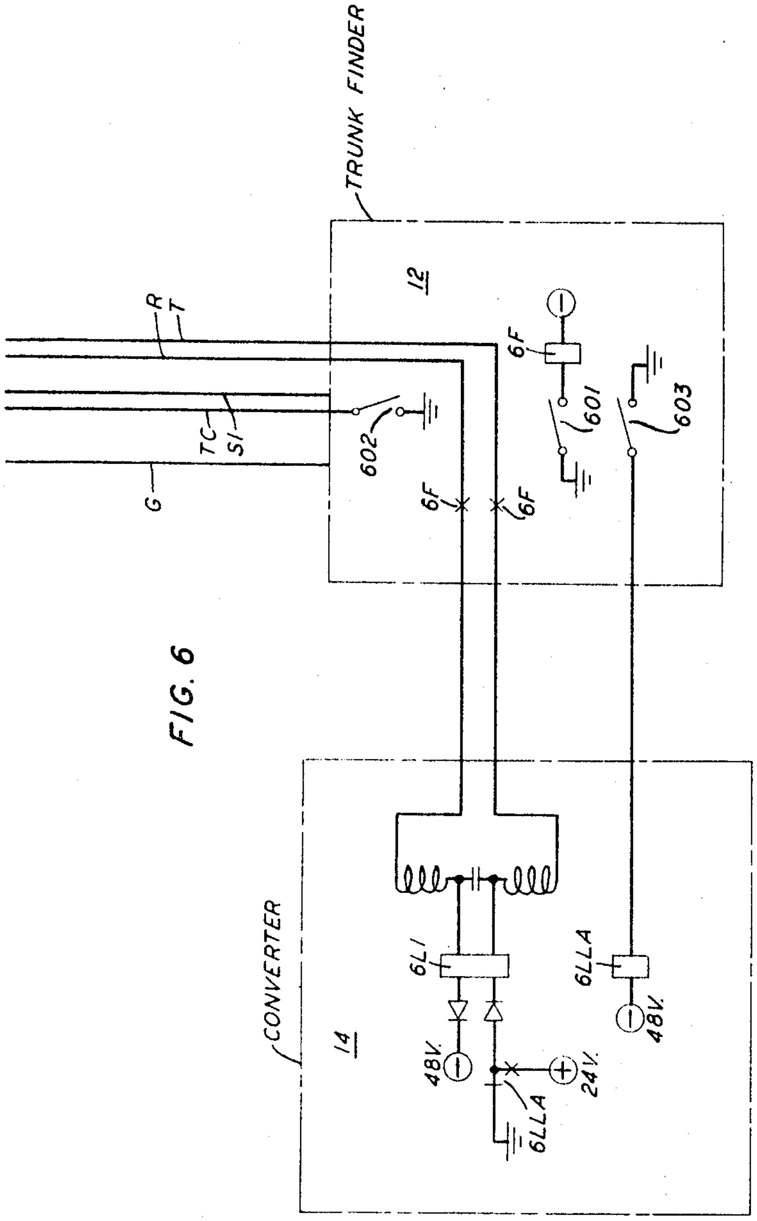

FIG. 3 includes the details of the originating and terminating line circuit of FIGS. 1 and 2;

FIG. 4 includes details of the converter trunk and range extender circuit of FIG. 1;

FIG. 5 includes details of the terminating line finder and range extender circuit of FIG. 2;

FIG. 6 includes details of the trunk finder and converter of FIG. 1; and

Figure 7:
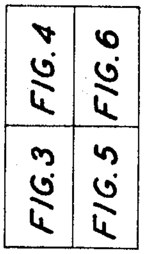

FIG. 7 indicates the appropriate disposition of FIGS. 3–6 to illustrate the invention.

General description

As show in FIG. 1, a long loop substation 10, having greater than a predetermined loop resistance, as well as other long loop lines (not shown) are included within special line finder circuit 15 which serves long lines only. It will be appreciated by those conversant in the art that segregating originating calling lines to include only long lines at line finder 15 is not a significant impediment in office design.

The converter trunk 11 which is customarily employed to route connections to a TOUCH-TONE converter is also adapted in the present arrangement (as shown in detail in FIG. 4) to provide range extension facilities. A converter trunk is used in the prior art as shown, for example, in Patent 3,133,155 of F. C. Kuchas of May 12, 1964. The converter trunk 11 is adapted to supply additional current (by use of higher voltages) to long loop station 10 and an amplifier is provided for A-C gain.

The converter trunk obtains access to converter 14 over the trunk finder 12. The interrelationship of the converter 11 and trunk finder 12 and converter 14 are omitted herein for the sake of clarity; reference may be made to the above-referred-to patent of F. C. Kuchas for a detailed explanation.

When the converter trunk 11 obtains access to converter 14 over trunk finder 12, a long loop signal is sent from the trunk finder to the converter 14. Thereupon, the converter 14 transfers to a high potential mode of operation in order to receive the TOUCH-TONE signals in a manner analogous to that described in an application of A. Feiner-A. Zarouni-C. W. Zebe, Ser. No. 402,081, filed Oct. 7, 1764, now Patent 3,339,027, issued Aug. 29, 1967.

When the D-C dialing is recognized or, alternatively, when TOUCH-TONE signaling is completed, converter 14 releases and the range extension circuit in the converter trunk is inserted into the connection between line finder 15 and first selector 16. The range extension circuit maintains direct current supervision over the call and provides A-C gain.

Referring to FIG. 2, the arrangement indicates the route of a terminating call from the connector to a terminating line finder 17 and ultimately over originating and terminating line circuit 18 to substation 10. On the advent of a terminating call, the connector 19 is seized in a conventional manner in accordance with step-by-step telephone operations. Thereupon, circuit 18 is energized and causes an idle terminating line finder 17 to start hunting for the line.

It may be parenthetically noted that the operation of a line finder in conjunction with a terminating call in step-by-step operation is extraordinary and that ordinary, conventional operation dictates the use of a line finder on an originating call, as, for example, described above for FIG. 1.

When the terminating line finder seizes the line, a range extender circuit, similar to that shown in FIG. 5, is included in the circuit path which thereafter extends from connector 19 to the terminating line finder and range extender circuit 17 to the substation 10. Thereupon, the call may be answered by substation 10 and the range extender circuit within the terminating line finder 17 provides line supervision and voice amplification.

Detailed description

As shown in FIGS. 3–6, long line substation 10, which requires range extension, that is, D-C repetition and voice amplification, is connected to a modified line circuit 18 within the step-by-step office. The line circuit is connected to both a conventional line finder 15 and a terminating line finder 17 (FIG. 2) equipped with range extension which hunts for the called substation 10 on terminating calls. In contrast, line finder 15 hunts for calling substation 10 on originating calls.

For purposes of illustration, it will be assumed that an originating call is initiated by the customer at long line substation 10. Relay 3L, which is designed as a sensitive relay to respond to reduced current over long lines, is operated over a path from negative battery, upper windings of relay 3L, contacts of relay 3CO, contacts of relay 3TER, loop conductor R, substation 10, loop conductor T, additional contacts of relay 3TER, additional contacts of relay 3CO, lower winding of relay 3L to ground. The contacts of relay 3L ground start lead ST to the line finder 15 to initiate conventional operation therein. When line finder 15 seizes the calling line terminals, relay 3CO is operated over the sleeve conductor S from the line finder, winding of relay 3CO to negative battery. This action is performed conventionally and is shown symbolically by manual switch 311. Operation of cut-off relay 3CO divorces the line relay 3L from the tip and ring conductor in the usual manner and ground on the sleeve conductor S holds relay 3CO operated until the call is terminated.

As shown in FIG. 4, the converter trunk 11 is utilized in prior practice to interpose the converter 14 of FIG. 6 between the line finder and the first selector, as described in the F. C. Kuchas patent. In this instance, however, the converter trunk 11 is also equipped with range extension circuitry including amplifier 4AMP and relay 4A to which a higher than normal voltage is applied.

When the converter trunk is seized, a ground is placed on sleeve conductor S from the line finder in a conventional manner shown herein symbolically by switch 312. Relay 4T1 is thereupon operated over the contacts of relay 4T2. Operation of relay 4T1 delivers a signal over conductor G to a trunk finder circuit 12 which initiates hunting for an idle converter. When an idle converter is found, the tip and ring conductors T and R are extended through the trunk finder into the converter as shown symbolically by the operation of relay 6F at manual switch 601. Thereupon, relay 4T2 is operated from negative battery, winding of relay 4T2, normal contacts of relay 4T2, conductor TC to the trunk finder. This type of operation is extended in detail in the above-referred-to Kuchas disclosure and shown herein symbolically by manual switch 602. Subsequently, dial tone is delivered to the calling customer and when dialing is recognized or TOUCH-TONE signaling is completed, the converter 14 releases from the connection.

More specifically, as shown in FIG. 6, the converter trunk 11 is coupled to trunk finder 12. When the trunk finder serves a call, a ground is extended to a converter to operate relay 6LLA, as shown symbolically by manual switch 603. The operation of relay 6LLA prepares the converter to serve the long loop call and to initiate the connection of higher battery potential on the line. Thus, the operation of relay 6LLA connects 24-volt battery to relay 6L1 in lieu of ground providing a cumulative voltage of 72 volts in lieu of the normal 48-volt potential. In consequence, during signaling, relay 6L1, which is coupled to the tip and ring conductors T and R through contacts 6F provides a higher than normal operating voltage to compensate for the increased resistance on the long loop line. The operation of relay 6LLA also prepares other circuits (not shown) in the converter to serve the long loop call.

When all the digits have been received and repeated to the switch train, the converter releases whereupon the converter trunk includes the range extender circuit in the switching path.

Moreover, when the converter releases relay 4T1 priorly held operated over conductor TC is released in the manner described in the Kuchas disclosure and shown herein symbolically at manual switch 602. At this time, the range extender circuit is included in series with the calling connection as shown in FIG. 4. This path is shown in bold solid outline and may be traced from substation 10, tip and ring conductors T and R of the loop contacts of relay 3TER in parallel, conductors T and R, line finder 15, conductors T and R extending to the converter trunk 11, contacts of relay 4T2, contacts of relay 4T1, contacts of relay 4R, amplifier 4AMP, additional contacts of relay 4R, contacts of relay 4A, additional contacts of relay 4T2, additional contacts of 4T1, conductors T and R extending to the first selector and thereupon to the switch train.

Relay 4A provides supervision of the call and amplifier 4AMP provides A-C gain. In any situation in which ringing must be extended back to the calling subscriber, relay 4R will be operated over the bridge diode rectifier and, in turn, control bypassing of the amplifier at the contacts of relay 4R during ringing cycles.

Terminating call

As indicated above in the general description, the use of a terminating line finder 17 precludes the necessity for call number segregation. In this manner, long loop lines need not be coupled on a segregated basis to particular connector banks. Instead, the calls are routed from the connector to an associated terminal on the line finder circuit 17 which incorporates range extension. Thus, if it is assumed for illustrative purposes that a terminating call is to be extended to connector 19 from an incoming selector (not shown) in the conventional manner, ultimately a path is available from connector 19, sleeve conductor S, terminal S of the line finder 17 (after the line finder seizes the called terminals), conductor S1, contacts of relay 3CO, contacts of relay 3OFL, winding of relay 3TER to negative battery. The extension of a ground condition over this path is shown symbolically by manual switch 51 in the connector circuit.

The contacts of relay 3TER extend a circuit over the contacts of relay 3OFL to conductor ST1 which extends to the terminating line finder start circuit (not shown in detail herein). In accordance with conventional operation, the terminating line finder is thereupon energized to seize the called line terminal. Thereupon, a path shown in dotted bold outline extends over the incoming selectors (not shown) of the switch train to connector 19 and conductors T1, R1, and S1 of the terminating line finder, amplifier 5AMP, conductors T and R extending to the jacks of the finder bank and thereupon to substation 10 via the originating and terminating line circuit 18. In this manner, the terminating line finder is interposed between the connector and the called substation to provide the range extension facilities.

When the terminating line finder is seized, the called line terminal and the contacts of relay 3TER isolate the calling line from the line relay 3L to prevent seizure of the originating line finder.

If a terminating line finder is unavailable, relay 3OFL will be operated from the terminating line finder group busy circuit 313, as shown symbolically by manual switch 314. Thereupon, overflow tone supply is coupled to the calling substation line over the switch path.

Relay 5K is operated over the ground from the connector 19 and locks operated to the conventional sleeve ground. The operation of relay 5K prepares a path for applying ringing current to the called substation.

Relay 5R is responsive to ringing current which is provided from connector 19 in a conventional manner. The operation of relay 5R extends ringing current from the ringing machine (not shown) through the contacts of relay 5F, contacts of relay 5R to the ring conductor extending to the substation line. A corresponding path is available to 24-volt battery over the contacts of relays 5F and 5R and the tip conductor T.

Relay 5A responds to an answer condition at the called customer substation to trip ringing in the conventional manner during the silent interval. Moreover, amplifier 5AMP is energized at the contacts of 5A. Relay 5F trips ringing when the called party answers during the ringing cycle.

It will be noted that the line circuit 18 has, in the above arrangement, been energized on both originating and terminating connections. Moreover, a line finder has been utilized on the terminating operation of the connection to insert range extension in contrast to conventional practice wherein a line finder is used exclusively on originating connections and a connector is used to complete the terminating operation of the connection.

It is to be understood that the above-described arrangements are illustrative of the application of the principles of the invention. Numerous other arrangements may be devised by those skilled in the art without departing from the spirit and scope of the invention.

What is claimed is:

1. A step-by-step telephone switching system including a plurality of long substation lines having a sufficient loop resistance to require range extension, a connector circuit for extending terminating connections to said long substation lines, and a terminating line finder circuit responsive to the extension of a connection by said connector circuit to one of said long substation lines for including range extension facilities in said circuit.

2. A step-by-step telephone switching system in accordance with claim 1 wherein said range extension facilities includes means for providing A-C amplification in said switching system.

3. A step-by-step telephone switching system including a plurality of long lines having a sufficient loop resistance to require range extension, an originating line finder connectable to said lines for extending a calling connection from said lines, a connector circuit for extending terminating connections to called ones of said long lines, and terminating line finder means responsive to the extension of a connection to one of said long lines by said connector circuit for interposing range extension in series with said connector circuit and long line.

4. A step-by-step telephone switching system in accordance with claim 3 including, in addition, a first selector circuit for extending said calling connection, and a converter trunk circuit for incorporating range extension in said calling connection in series between said originating line finder and said first selector circuit.

5. A step-by-step telephone switching system including a plurality of long lines requiring range extension, an originating line finder connectable to one of said lines for extending calling connections from said one of said lines, an originating and terminating line circuit connected to said one of said lines, line relay means in said originating and terminating line circuit responsive to a calling connection at said one of said lines for initiating the operation of said originating line finder, a connector circuit for extending terminating connections to said one of said lines, terminating line finder means, terminating relay means in said originating and terminating line circuit responsive to extension of a terminating connection to a called one of said long lines for initiating the operation of said terminating line finder means, and additional means responsive to the operation of said terminating line finder means for incorporating A-C amplification in the path extending to said called one of said long lines and between said connector circuit and said originating and terminating line circuit.

6. A step-by-step telephone switching system in accordance with claim 5 including in addition means responsive to the operation of said terminating relay means for precluding the subsequent operation of said line relay means and said originating line finder.

7. A step-by-step telephone switching system including a plurality of long lines having sufficient loop resistance to require range extension, an originating line finder connectable to said lines for extending calling connections from said lines, a first selector circuit connectable to said originating line finder, a converter trunk circuit incorporating range extension and responsive to the operation of said line finder for including A-C amplification and D-C repetition on originating connections between said originating line finder and said first selector circuit, a connector circuit for extending terminating connections to called ones of said lines, terminating line finder means responsive to the extension of a connection by said connector to a called one of said long lines for seizing said called line and said connector circuit, and means in said terminating line finder means for interposing range extension including A-C amplification in series between said connector circuit and said called line.

8. A step-by-step telephone switching system in accordance with claim 7 including in addition an originating and terminating line circuit comprising originating line relay means effective in response to originating connections for initiating the operation of said originating line finder means, and terminating line relay means effective in response to terminating connections for initiating the operation of said terminating line finder means and for precluding the operation of said originating line finder.

References Cited

UNITED STATES PATENTS

| | | | |
|---|---|---|---|
| 1,647,796 | 11/1927 | Glezen et al. | 179—16 |
| 1,763,893 | 6/1930 | Krecek | 179—16 |

KATHLEEN H. CLAFFY, Primary Examiner

J. S. BLACK, Assistant Examiner